United States Patent
Oddiraju et al.

(10) Patent No.: US 7,783,875 B2
(45) Date of Patent: Aug. 24, 2010

(54) SYSTEM BOOT OPTIMIZER

(75) Inventors: Chandar Kumar Oddiraju, Cupertino, CA (US); Demis Flanagan, Cupertino, CA (US); Frank E La Fetra, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 11/171,479

(22) Filed: Jul. 1, 2005

(65) Prior Publication Data
US 2007/0016324 A1   Jan. 18, 2007

(51) Int. Cl.
G06F 9/24 (2006.01)
G06F 15/177 (2006.01)

(52) U.S. Cl. ................ 713/2; 713/1; 713/100
(58) Field of Classification Search .......... 713/1, 713/2, 100
See application file for complete search history.

(56) References Cited

U.S. PATENT DOCUMENTS

| | | | | |
|---|---|---|---|---|
| 5,668,992 | A * | 9/1997 | Hammer et al. | 713/1 |
| 5,794,052 | A * | 8/1998 | Harding | 717/178 |
| 6,546,472 | B2 * | 4/2003 | Atkinson et al. | 711/156 |
| 6,754,817 | B2 * | 6/2004 | Khatri et al. | 713/1 |
| 6,976,193 | B2 * | 12/2005 | Dubal | 714/47 |
| 6,990,574 | B2 * | 1/2006 | Bidarahalli et al. | 713/2 |
| 7,234,047 | B1 * | 6/2007 | Mahmoud | 713/1 |
| 7,243,245 | B2 * | 7/2007 | Pagan | 713/300 |
| 2003/0157896 | A1 * | 8/2003 | Mee et al. | 455/67.1 |
| 2004/0030882 | A1 * | 2/2004 | Forman | 713/100 |
| 2004/0040025 | A1 * | 2/2004 | Lehtinen | 718/104 |
| 2004/0136533 | A1 * | 7/2004 | Takagaki et al. | 380/255 |
| 2005/0268299 | A1 * | 12/2005 | Picinich et al. | 718/100 |
| 2006/0174228 | A1 * | 8/2006 | Radhakrishnan et al. | 717/127 |
| 2006/0236085 | A1 * | 10/2006 | Norton | 713/2 |

OTHER PUBLICATIONS

Joe Wilcox, "Windows memory issue clogs some Compaq PCs" Dec. 31, 1999 CNET News.*
Startup Delayer, V2.1.10, Released $2^{nd}$ Mar. 2004.*

* cited by examiner

*Primary Examiner*—Vincent T Tran

(57) ABSTRACT

A system for optimizing an operating system startup process is described. The system includes a performance monitoring tool arranged to monitor a performance parameter of a computer system and a startup control tool arranged to control startup initiation of processes based on the performance parameter monitored by the performance monitoring tool. A method of optimizing an operating system startup process is described. A computer system performance parameter is monitored. Execution of a predetermined process by the computer system is enabled if the computer system performance is outside a predetermined threshold.

19 Claims, 5 Drawing Sheets

SYSTEM BOOT OPTIMIZER

FIELD OF THE INVENTION

The present invention relates to a system startup process.

BACKGROUND

During a computer system operating system boot sequence, upon completion of the boot process several applications execute based on a startup process list, e.g., a Registry Run key section of Microsoft Windows operating system available from Microsoft Corp, Redmond, Wash. Other operating systems (e.g., Linux) include an analogous structure. All the processes, e.g., executable software applications, in the startup process list begin execution at the same, or substantially the same, time thereby causing the system to overload the central processing unit (CPU) and/or input/output (I/O) capability of the computer system. At this point, the computer system appears to be non-responsive, e.g., the computer system is unable to respond rapidly to user-initiated actions. The period of non-responsiveness of the computer system continues for a period of time until all the startup processes release both the CPU and I/O usage. Additionally, in some instances the input/output mechanism, e.g., disk throughput, of the computer system is maximized during process startup by the operating system.

SUMMARY

The present invention provides a computer system startup process.

A system embodiment for optimizing an operating system startup process includes a performance monitoring tool arranged to monitor a performance parameter of a computer system and a startup control tool arranged to control startup initiation of processes based on the performance parameter monitored by the performance monitoring tool.

A method embodiment of optimizing an operating system startup process includes monitoring computer system performance parameters and enabling execution of a predetermined process by the computer system if the computer system performance is outside a predetermined threshold.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

An embodiment resolves inadequate system responsiveness during startup of a computer system operating system by executing processes in a startup list, e.g., running applications listed in the Registry Run Key section, in a sequence such that the operating system is not overly utilizing or maximizing CPU usage. During the operating system boot or startup process only a few applications are necessary to enable a user to use the operating system. Additional applications may be necessary but not immediately required during or immediately subsequent to the boot process. The additional applications can be started at a time during which the operating system is not being used by the user. According to an embodiment, the execution of processes during operating system startup is controlled based on characteristics of the computer system, e.g., CPU or processor usage level and disk throughput level.

Figure 1:
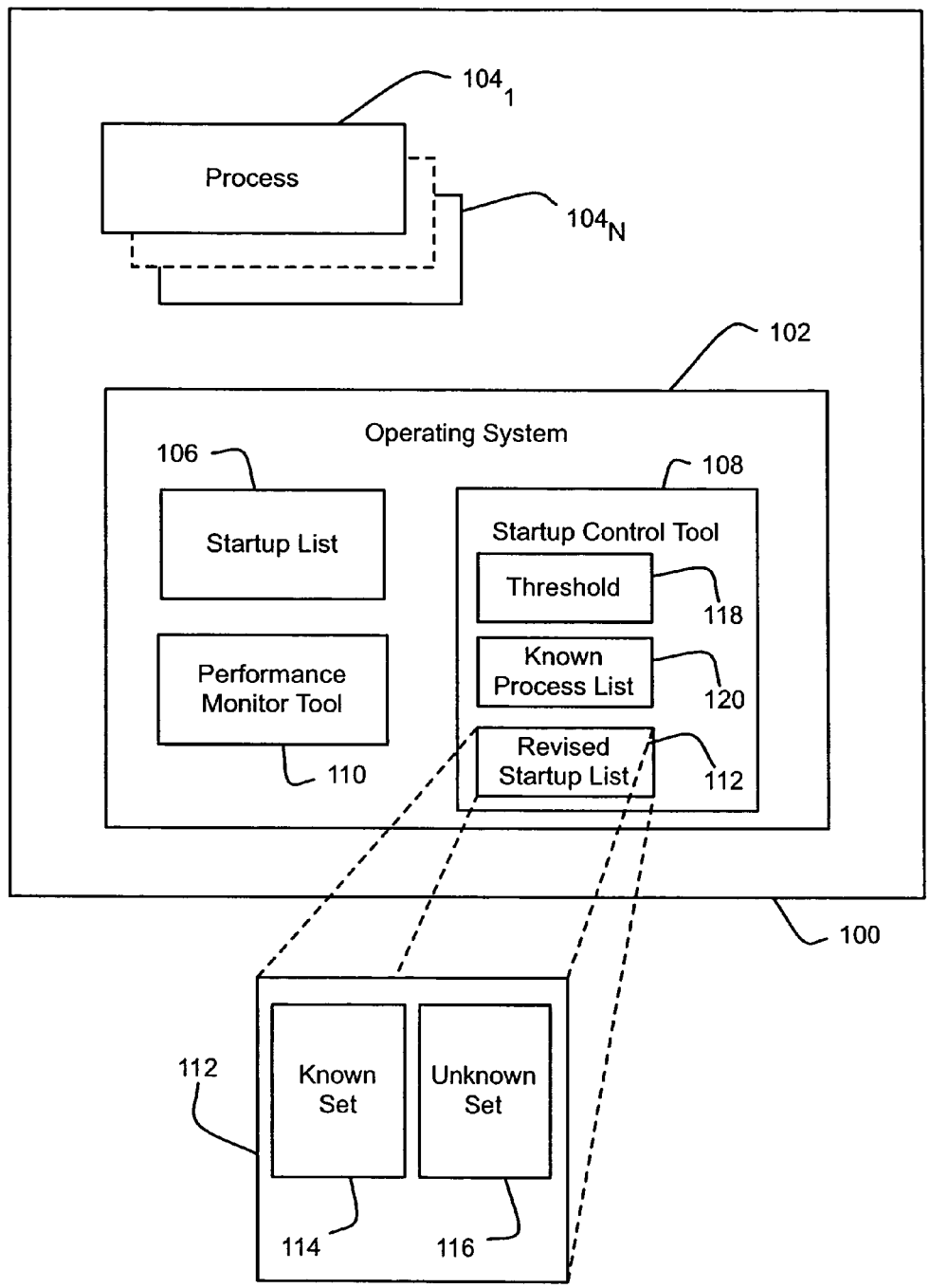
FIG. 1 is a high level block diagram of an embodiment installed on a computer system.

FIG. 1 depicts a high level functional block diagram of a portion of a computer system 100 including an embodiment installed therein. Computer system 100 includes an operating system 102 and several processes $104_1$-$104_N$. Although numerous processes $104_1$-$104_N$ may be scheduled and executed by computer system 100, for clarity only a single process 104 is discussed hereinafter. Individual processes $104_1$-$104_N$ may be discussed as merited in the exemplary embodiments below. Processes $104_1$-$104_N$ may be individual executable software applications or multiple processes together may form an executable software application. Operating system 102 and processes $104_1$-$104_N$ are stored in memory, e.g., a random access memory, a read only memory, a hard drive storage device connected to/forming a part of computer system 100, or other storage device, etc. and executed by a processor (not shown) of the computer system. In an other embodiment, operating system 102 and/or processes $104_1$-$104_N$ are stored in a storage device (not shown) separate from but connectable with computer system 100, e.g., a networkable storage device, a directly connectable storage device, a removable storage device, etc.

As depicted in FIG. 1, operating system 102 includes a startup list 106 including a list of identifiers of one or more of processes $104_1$-$104_N$ which are to be executed during the operating system 102 boot process. Operating system 102 further includes a startup control tool 108 for modifying startup list 106, and performance monitor tool 110 for monitoring performance of computer system 100.

Turning first to performance monitor tool 110, the tool monitors one or more performance parameters of computer system 100, e.g., CPU utilization, disk throughput, available memory, and timing relationships and interrelationships among performance parameters, etc. Startup control tool 108 accesses performance monitor tool 110 in order to obtain performance parameter values. In another embodiment, performance monitor tool 110 provides a performance parameter value to startup control tool 108 on a predetermined scheduled basis. In a further embodiment, performance monitor tool 110 is a stand-alone executable software application executing outside the operating system 102 and able to communicate with startup control tool 108 and monitor the performance of the operating system. In other embodiments, startup control tool 108 monitors more than one performance parameter in order to determine the performance of computer system 100. For example, startup control tool 108 can monitor both a CPU utilization value and a disk throughput value. Other performance parameters and combinations are usable in other embodiments.

Turning now to startup control tool 108, according to the below-described embodiments, startup control tool 108 modifies startup list 106 to include at least a reference to the startup control tool and moves one or more of the existing startup list entries to a revised startup list 112 within startup control tool 108. In other embodiments, startup control tool 108 moves the existing startup list entries to a revised startup list 112 located other than within startup control tool 108. In an other embodiment, startup control tool 108 modifies the startup list entries such that the startup control tool is the first process referred to on list 112 thereby insuring the tool will be executed prior to other processes at operating system startup. In other embodiments, startup control tool 108 copies the contents of startup list 106 to revised startup list 112.

Startup control tool 108 analyzes the existing startup list entries, e.g., one or more process $104_1$-$104_N$ references, and categorizes each entry into two different sets, i.e., a known set 114 and an unknown set 116, in order to provide a responsive and stable operating system 102 for usage by a user. Startup control tool 108 places in known set 114 process references from startup list 106 of which the startup control tool is knowledgeable about the process to which the references refer. For example, operating system executables and processes and executable software applications and processes whose execution may be delayed later in time without affecting the user experience with respect to operating system 102, i.e., the known set 114 includes references to processes which may be delayed without affecting the operation of operating system 102. That is, known set 114 includes references to processes about which startup control tool 108 has a priori information.

In an embodiment, startup control tool 108 compares processes in startup list 106 to a priori information about known processes stored in a known process list 120. In other embodiments, startup control tool 108 includes the known process information internal to the tool and/or stored in a location external to the tool.

Startup control tool 108 includes in unknown set 116 process references from startup list 106 of which the startup control tool has no additional and/or a priori information about the processes to which the reference refer. For example, executable software applications not installed as part of a known operating system installation and not part of a known set of executable software applications.

After startup control tool 108 modifies startup list 106 as described above and the startup control tool is executed at operating system 102 startup due to being included in the startup list, startup control tool 108 monitors a performance parameter value of computer system 100 received from performance monitor tool 110 in order to determine at which time to cause execution of a process $104_1$-$\psi_N$ referenced by an entry in revised startup list 112, e.g., a process reference from known set 114 and unknown set 116. In different embodiments, more than two sets 114, 116, e.g., based on different characteristics of the processes, are employed as needed to continue to provide a stable and responsive operating system for use by a user. In another embodiment, startup list 106 is considered as a third category of processes, e.g., known and having a priority or importance higher than the processes in revised startup list 112. For example, necessary processes related to operating system startup may be allowed to remain on startup list 106 in addition to startup control tool 108.

In operation, after startup execution of startup control tool 108, the tool may provide a settling period of time to the CPU, e.g., to provide time for CPU utilization to decrease from the initial startup loading based on required process execution start, thereby enabling the user interface portion of the operating system more CPU-time to attend to user requests. Then, after the CPU utilization drops below a predetermined threshold 118, startup control tool 108 causes execution of the processes referenced in revised startup list 112 in a controlled manner, for example one at a time in sequence, delaying startup execution of the next process in the list until CPU utilization drops below the predetermined threshold. In another embodiment, startup control tool 108 is able to cause more than a single process from revised startup list 112 to begin execution after a performance parameter value is outside the threshold 118.

Predetermined threshold 118 is a value related to a performance parameter monitored by performance monitor tool 110. In an additional embodiment, startup execution of a process by the startup control tool 108 requires the CPU utilization to be below threshold 118 for a given time period, i.e., a number of samples of a performance parameter, each sample a set number of milliseconds apart, all of which are predetermined values. In another embodiment, threshold 118 is dynamically determined, for example a large "spike" or large increase in CPU utilization can require a different length time period of low CPU utilization than a situation without the "spike." In this manner, all the startup processes are launched while enabling a better user experience regarding operating system 102 responsiveness. Startup control tool 108 begins causing sequential execution of processes referenced in known set 114 and then proceeds to cause execution of processes referenced in unknown set 116. As startup control tool 108 causes execution of processes based on revised startup list 112, the tool 108 monitors the performance parameter from performance monitor tool 110 and compares the value to predetermined threshold 118. If the performance parameter value is outside the threshold 118, startup control tool 108 causes execution of another process from revised startup list 112. For example, threshold 118 may require CPU utilization be below fifty percent for 10 milliseconds prior to causing execution of another process referenced in revised startup list 112. Additionally as described above, more than a single parameter comparison, e.g., more than a single parameter value may be analyzed against more than a single threshold 118, may be made prior to causing execution of another process. Alternatively, threshold 118 may require available memory or other parameter values to be greater than a predetermined value.

In another embodiment, startup control tool 108 performs an additional check to determine if the performance parameter value(s) remains outside the threshold 118 for a predetermined amount of time. In this manner, a temporary drop in a performance parameter value is accounted for by control tool 108.

In another embodiment, startup control tool 108 compares a second performance parameter value to a second predetermined threshold value (not shown). For example, startup control tool 108 monitors a measurement of the disk throughput of computer system 100. According to this embodiment, startup control tool 108 will only cause execution of another process from revised startup list 112 if the first performance parameter value, e.g., CPU utilization, falls below the threshold 118 and the second performance parameter value, e.g., disk throughput, falls below the second predetermined threshold value.

In an embodiment, necessary process references remaining on startup list 106 are able to execute in order along with startup control tool 108. In this manner, the remaining processes necessary for startup of operating system 102 begin execution and startup control tool 108 controls the timing and order of execution of processes referenced from known set 114 and unknown set 116. Additionally, startup control tool 108 is able to control execution of processes based on revised startup list 112 while minimizing the performance impact on computer system 100 and operating system 102 startup due to the execution of the additional processes from the revised startup list.

Figure 2:
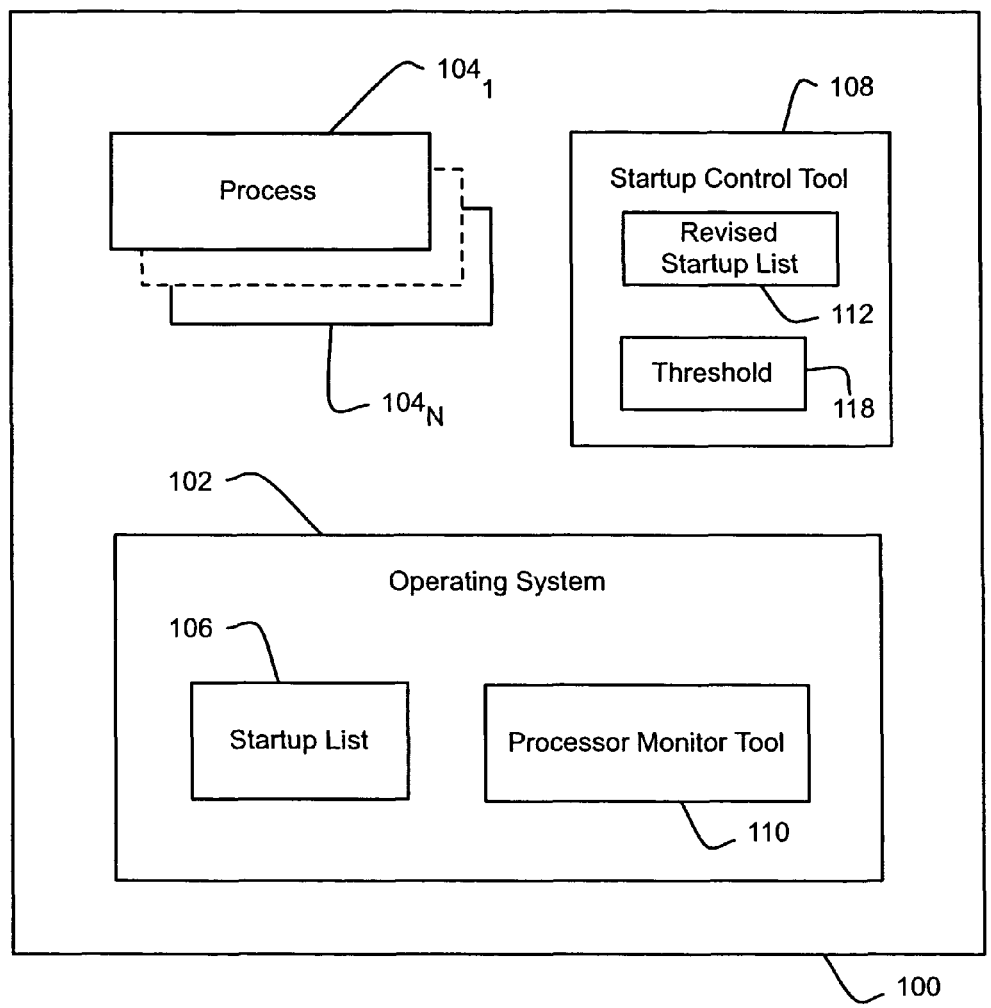
FIG. 2 is a high level block diagram of another embodiment installed on a computer system.

FIG. 2 depicts an embodiment wherein startup control tool 108 is located outside operating system 102. The above description of operation of startup control tool 108 is applicable to the FIG. 2 embodiment with the only difference being the storage location of the startup control tool.

Figure 3:
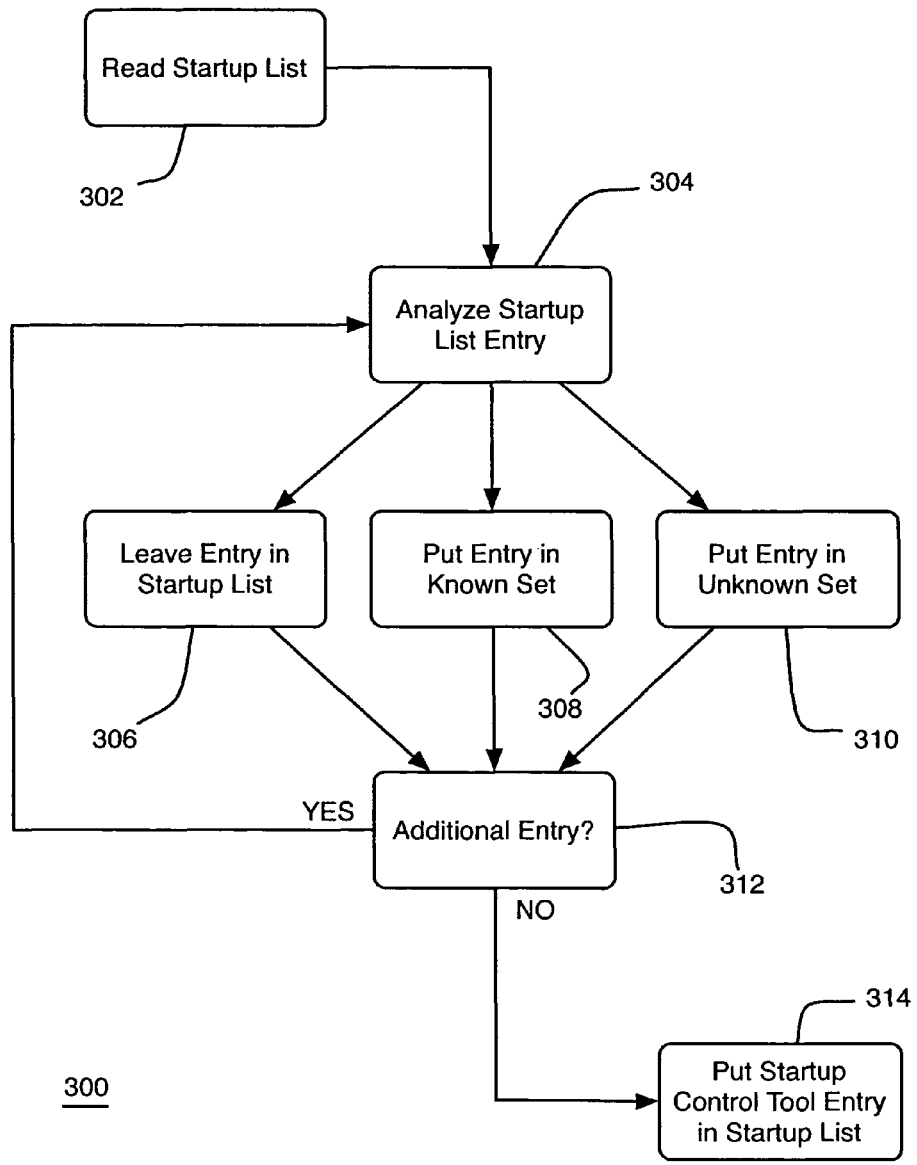
FIG. 3 is a high level flow chart of a portion of a startup list modification process according to an embodiment.

FIG. 3 depicts a high level flow chart of a portion of a process flow according to an embodiment described above. Specifically, FIG. 3 depicts a startup list modification process 300 embodying the initial modification of startup list 106 by startup control tool 108. The process flow begins at step 302 wherein execution of startup control tool 108 by computer system 100 causes the startup control tool to read the startup list 106. The flow of control proceeds to step 304.

During step 304, startup control tool 108 analyzes an entry from startup list 106 to determine whether the entry, i.e., a process reference, matches: (a) a known process to be left in startup list 106; (b) a known process to be placed in known set 114, and (c) an unknown process to be placed in unknown set 116. That is, startup control tool 108 compares a read entry to known process list 120. Unknown processes are not on known process list 120. In another embodiment, startup control tool 108 can be configured to handle "unknown" processes as either left alone, e.g., hands-off processing, or managed, e.g., hands-on.

Depending on the outcome of the step 304 analysis, the flow of control proceeds to: (a) step 306 and leaves the known process reference in startup list 106; (b) step 308 and places the known process reference in known set 114 in revised startup list 112; and (c) step 310 and places the unknown process reference in unknown set 116 in revised startup list 112. After completing the appropriate step 306, 308, 310, the flow of control proceeds to step 312.

At step 312, startup control tool 108 determines whether an additional entry remains in startup list 102 to be analyzed and categorized. If the outcome of the step 312 determination is positive, i.e., another process reference to be analyzed is on startup list 102, the flow of control returns to step 304 and the flow proceeds as described above. If the outcome of the step 312 determination is negative, i.e., no process references remain to be analyzed on startup list 102, the flow of control proceeds to step 314 and startup control tool 108 places an entry in startup list 106 corresponding to the startup control tool.

In another embodiment, the order of steps performed in process 300 may differ; however, the basic functionality for analyzing and categorizing the startup list 106 entries remains the same.

Figure 4:
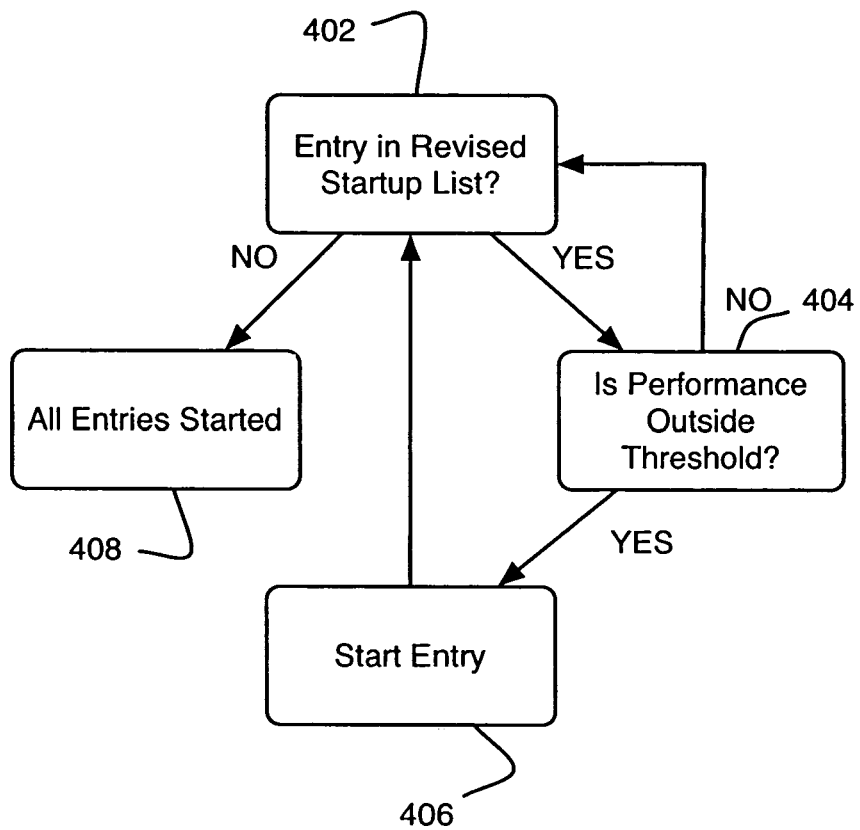
FIG. 4 is a high level flow chart of another portion of a process control process according to an embodiment.

FIG. 4 depicts a high level flow chart of a portion of a process flow according to an embodiment described above. Specifically, FIG. 4 depicts a process startup procedure 400 performed during operation of startup control tool 108 during a computer system startup process.

The process flow begins at step 402 wherein execution of startup control tool 108 as part of computer system 100 executing processes referenced on startup list 106 causes the startup control tool to determine whether an entry exists in revised startup list 112 which has not been started or if there are no entries in the revised startup list. If there is an entry remaining to be started, the flow of control proceeds to step 404 and startup control tool 108 compares the performance parameter value from performance monitor tool 110 to performance threshold 118. If the performance parameter value is outside threshold 118, e.g., the value is below the threshold, the revised startup list entry is started (step 406) and the flow proceeds to return to step 402. If the performance parameter value is not outside threshold 118, e.g., the value is above or equal to the threshold, the flow proceeds to return to step 402.

Returning to the step 402 determination, if there are no entries remaining in revised startup list 112, the flow of control proceeds to step 408 and startup control tool 108 completes execution.

Figure 5:
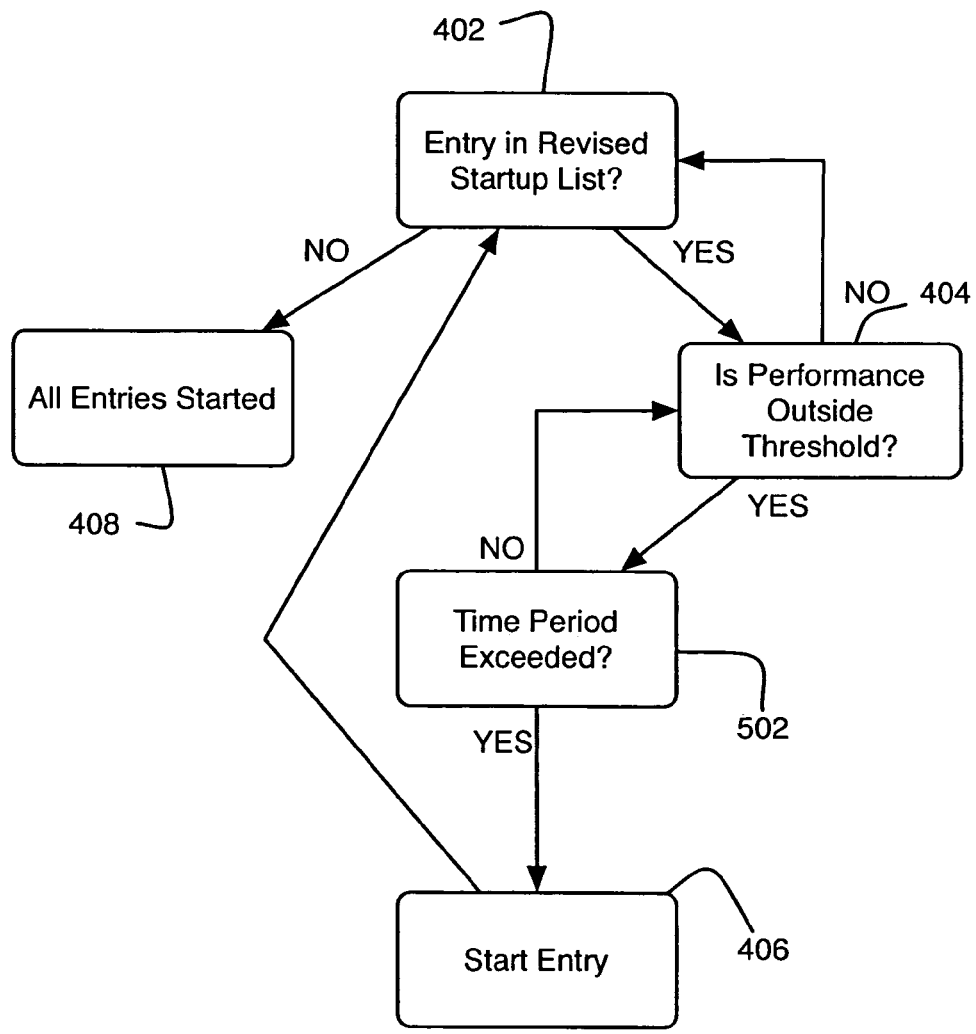
FIG. 5 is a high level flow chart of a process control process according to another embodiment.

FIG. 5 depicts a high level flow chart of another embodiment of a portion of a process flow similar to the FIG. 4 embodiment. Specifically, FIG. 4 depicts a process startup procedure 500 performed during operation of startup control tool 108 during a computer system startup process.

As described above, the process flow begins at step 402 wherein execution of startup control tool 108 as part of computer system 100 executing processes referenced on startup list 106 causes the startup control tool to determine whether an entry exists in revised startup list 112 which has not been started or if there are no entries in the revised startup list. If there is an entry remaining to be started, the flow of control proceeds to step 404 and startup control tool 108 compares the performance parameter value from performance monitor tool 110 to performance threshold 118. If the performance parameter value is outside threshold 118, e.g., the value is below the threshold, the flow proceeds to return to step 502. If the performance parameter value is not outside threshold 118, e.g., the value is above or equal to the threshold, the flow proceeds to return to step 402.

Continuing with step 502, startup control tool 108 determines whether a predetermined time period has elapsed during which the performance parameter value has remained outside threshold 118. If the predetermined time period has elapsed with the performance parameter value outside threshold 118, the flow proceeds to step 406 and the revised startup list entry is started. If the predetermined time period has not elapsed, the flow proceeds to return to step 404.

Returning to the step 402 determination, if there are no entries remaining in revised startup list 112, the flow of control proceeds to step 408 and startup control tool 108 completes execution.

In a computer system including the above embodiments, users are able to start using the computer system and operating system much earlier than the system without the startup control tool. As the computer system is not overloaded by processes starting up that were referenced in the startup list 106, the operating system is able to promptly respond to user initiated actions. The present inventors in preliminary tests have noticed an average of 30 seconds to 1 minute improvement in operating system startup performance. In an experiment monitored by the inventors a 15% improvement in boot time was found using an embodiment described above. In another experiment, the startup time using the above-described embodiment was reduced from 89.8 seconds to 76.7 seconds. The startup performance being measured from the system powered up time to the time at which the system allows the user to do something as soon as it displays the user desktop.

It will be readily seen by one of ordinary skill in the art that the embodiments fulfill one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A method for controlling an operating system startup process on a computer system, the method comprising:
   upon completion of computer system booting, enabling full launching of a first software application identified in a startup list stored on the computer system, the startup list identifying software applications to be fully launched during the operating system startup process;
   continually monitoring a performance parameter of the computer system as the first software application is launched during the operating system startup process;
   comparing the performance parameter with a threshold associated with the performance parameter;

if the performance parameter meets or exceeds the threshold, further enabling full launching of a next software application identified in the startup list as part of the operating system startup process; and if the performance parameter is below the threshold, delaying launching of the next software application identified in the startup list until a later point during the operating system startup process when the performance parameter meets or exceeds the threshold.

2. The method of claim 1, wherein the startup list is a modified startup list that has been modified from an original startup list, the method further comprising:

in response to identifying entries in the original startup list satisfying a predetermined criterion, adding the identified entries from the original startup list into a first set of the modified startup list; and adding other entries from the original startup list not satisfying the predetermined criterion to a second set of the modified startup list; and fully launching each of the software applications corresponding to the entries in the first set before launching software applications corresponding to the entries in the second set.

3. The method of claim 1, further comprising periodically repeating the comparing and sequentially enabling full launching of other software applications identified in the startup list as long as the performance parameter meets or exceeds the threshold, otherwise delaying launching of the other software applications.

4. The method of claim 1, wherein the performance parameter is CPU utilization and the performance parameter meets or exceeds the threshold if the CPU utilization falls below a predetermined level, and the performance parameter is below the threshold if the CPU utilization rises above the predetermined level.

5. The method of claim 1, wherein the performance parameter is disk throughput and the performance parameter meets or exceeds the threshold if the disk throughput meets or exceeds a predetermined level.

6. The method of claim 1, wherein the performance parameter is available memory and the performance parameter meets or exceeds the threshold if the available memory meets or exceeds a predetermined level.

7. The method of claim 1, wherein the startup list is a modified startup list and further comprising, prior to enabling launching, analyzing each entry in an original startup list.

8. The method of claim 7, wherein the analyzing comprises comparing each entry in the original startup list to entries in a known software application list and categorizing each entry in the original startup list into a known set or an unknown set of the modified startup list.

9. The method of claim 8, wherein enabling full launching comprises enabling full launching of a software application identified in the known set.

10. The method of claim 9, wherein each software application identified in the known set is launched prior to launching software applications identified in the unknown set.

11. A computer system comprising:

a performance monitoring tool executable in the computer system and configured to continually monitor a performance parameter of the computer system during full launching of software applications identified in a startup list during an operating system startup process that is performed upon completion of booting of the computer system, the startup list identifying the software applications to be fully launched during the operating system startup process; and a startup control tool executable in the computer system and configured to execute during the operating system startup process and to compare the performance parameter monitored by the performance monitoring tool with a threshold, the startup control tool further being configured to enable full launching of a next software application identified in the startup list if the performance parameter meets or exceeds the threshold but delay launching of the next software application if the performance parameter is below the threshold.

12. The computer system of claim 11, wherein the startup list is a modified startup list that has been modified from an original startup list, and wherein the startup control tool is configured to further:

in response to identifying entries in the original startup list satisfying a predetermined criterion, add the identified entries from the original startup list into a first set of the modified startup list; and add other entries from the original startup list not satisfying the predetermined criterion to a second set of the modified startup list; and fully launch each of the software applications corresponding to the entries in the first set before launching software applications corresponding to the entries in the second set.

13. The computer system of claim 11, wherein the startup control tool is further configured to periodically repeat the comparing and sequentially enable full launching of other software applications identified in the startup list as long as the performance parameter meets or exceeds the threshold but delay launching of the other software applications once the performance parameter falls below the threshold.

14. The computer system of claim 11, wherein the performance parameter is CPU utilization and the performance parameter meets or exceeds the threshold if the CPU utilization falls below a predetermined level.

15. The computer system of claim 11, wherein the performance parameter is disk throughput and the performance parameter meets or exceeds the threshold if the disk throughput meets or exceeds a predetermined level.

16. The computer system of claim 11, wherein the performance parameter is available memory and the performance parameter meets or exceeds the threshold if the available memory meets or exceeds a predetermined level.

17. The computer system of claim 11, wherein the startup list is a modified startup list and wherein the startup control tool is further configured to analyze each entry in an original startup list.

18. The computer system of claim 17, wherein the startup control tool is configured to compare each entry of the original startup list to entries in a known software application list and categorize each entry of the original startup list into a known set or an unknown set of the modified startup list.

19. The computer system of claim 18, wherein the startup control tool is configured to enable each software application identified in the known set to fully launch prior to launching software applications identified in the unknown set.

* * * * *